(12) United States Patent
Benveniste (10) Patent No.: US 8,004,975 B1
(45) Date of Patent: Aug. 23, 2011

(54) METHOD AND APPARATUS PROVIDING ADJACENT CHANNEL INTERFERENCE AVOIDANCE

(75) Inventor: Mathilde Benveniste, South Orange, NJ (US)

(73) Assignee: Avaya Inc., Basking Ridge, NJ (US)

( * ) Notice: Subject to any disclaimer, the term of this patent is extended or adjusted under 35 U.S.C. 154(b) by 1236 days.

(21) Appl. No.: 11/507,854

(22) Filed: Aug. 22, 2006

Related U.S. Application Data

(60) Provisional application No. 60/709,820, filed on Aug. 22, 2005, provisional application No. 60/720,488, filed on Sep. 27, 2005.

(51) Int. Cl.
*H04J 1/16* (2006.01)

(52) U.S. Cl. ........ 370/230; 370/338; 370/437; 370/443; 455/511

(58) Field of Classification Search ....... 455/450–452.1, 455/464, 509, 515–517, 524; 370/230, 338, 370/400, 437, 443
See application file for complete search history.

(56) References Cited

U.S. PATENT DOCUMENTS

| | | | |
|---|---|---|---|
| 6,853,620 B2 * | 2/2005 | Mauritz et al. | 370/237 |
| 2002/0019932 A1 * | 2/2002 | Toh et al. | 713/155 |
| 2004/0053620 A1 * | 3/2004 | Garrison et al. | 455/448 |
| 2005/0249145 A1 * | 11/2005 | Wilson | 370/316 |
| 2006/0019604 A1 * | 1/2006 | Hasarchi | 455/15 |
| 2006/0121854 A1 * | 6/2006 | Abhishek et al. | 455/63.1 |
| 2006/0126661 A1 * | 6/2006 | Zheng et al. | 370/469 |
| 2007/0060168 A1 * | 3/2007 | Benveniste | 455/450 |
| 2007/0153710 A1 * | 7/2007 | Hopkins | 370/254 |

\* cited by examiner

*Primary Examiner* — Dominic E Rego
(74) *Attorney, Agent, or Firm* — Chapin IP Law, LLC; David W. Rouille, Esq.

(57) ABSTRACT

A method, apparatus and computer program product for providing adjacent channel interference avoidance is presented. A first set of channels and a second set of channels of a Radio Frequency (RF) spectrum used by the wireless network are defined, the first set having a plurality of channels and the second set having a plurality of channels, and wherein the first set and the second set have mutually non-adjacent channels. A channel in the first set is designated as the control channel, the control channel being non-adjacent to channels in the second set, and used by all nodes of the wireless network. The channels in the first spectrum are utilized for the control channel and for data channels for unicast transmissions between single-radio nodes. The channels of the second set are utilized as data channels for unicast and multicast transmissions by multi-radio nodes. Adjacent channel interference between data transmissions on multiple radios located in the same device is avoided by allowing adjacent-channel transmissions only when they go in the same direction (either both incoming or outgoing) and by sending acknowledgments on the control channel.

16 Claims, 6 Drawing Sheets

METHOD AND APPARATUS PROVIDING ADJACENT CHANNEL INTERFERENCE AVOIDANCE

CROSS REFERENCE TO RELATED APPLICATIONS

The present application claims the benefit of U.S. Provisional Patent Application No. 60/709,820, filed on Aug. 22, 2005, and U.S. Provisional Patent Application No. 60/720,488 filed Sep. 27, 2005, the disclosures of which are incorporated herein by reference.

BACKGROUND

Growth in demand for Wireless Local Area Networks (WLANs) is driving the development of new technology to provide higher throughput. To a greater extent this growth is due to the increased number of users and applications desiring wireless transmission and to a lesser extent to the emergence of new applications needing higher transmission rates along a single connection between two points. Previous work has focused on increasing link throughput. This is necessary for single-stream high throughput applications. While it helps increase aggregate throughput, it is not the only way to do so. A MAC-based approach that enables the parallel use of multiple channels in a BSS, or a wireless mesh, can increase aggregate throughput.

IEEE 802.11 has been allocated multiple non-overlapping channels. (i.e., 3 channels are available in the 2.4 GHz ISM RF band for 802.11b/g and 12 channels in the 5 GHz U-NII RF band for 802.11a). These channels can be used simultaneously, if the transmitter of one channel and the receiver of the other have sufficient separation between them to render negligible any interference (referred to as adjacent channel interference or ACI) that would result from energy from the transmitter side lobes spreading out across the spectrum onto the other channel. When co-locating multiple radios in the same station, the interference arising when a station receives and transmits simultaneously on adjacent (in the RF spectrum) channels is so high that it blocks reception. Multiple radios are useful in increasing node-processing rates in stations where high traffic concentration is expected.

SUMMARY

Conventional mechanisms such as those explained above suffer from a variety of deficiencies. Specifically, in order to maximize throughput in these types of networks, adjacent channel interference must be minimized or avoided.

In a particular embodiment of a method for providing adjacent channel interference avoidance in a wireless network including a plurality of nodes, the wireless network having a control channel and at least one data channel, the method includes defining a first set and a second set of a Radio Frequency (RF) spectrum used by the wireless network, the first set having a plurality of channels and the second set having a plurality of channels, and wherein the first set and the second set have mutually non-adjacent channels. The method further includes designating a channel in the first set as the control channel, the control channel being non-adjacent to channels in the second set, and used by all nodes of the wireless network. The method further includes utilizing the control channel and other channels in the first spectrum for unicast transmissions between single-radio nodes and utilizing the channels of the second set as data channels for unicast and multicast transmissions by multi-radio nodes.

Other embodiments include a computer readable medium having computer readable code thereon for providing adjacent channel interference avoidance in a wireless network having a plurality of nodes, a control channel and at least one data channel. The computer readable medium includes instructions for defining a first set and a second set of a Radio Frequency (RF) spectrum used by the wireless network, the first set having a plurality of channels and the second set having a plurality of channels, and wherein the first set and the second set have mutually non-adjacent channels. The computer readable medium further includes instructions for designating a channel in the first set as the control channel, the control channel being non-adjacent to channels in the second set, and used by all nodes of the wireless network as well as instructions for utilizing the control channel and other channels in the first spectrum for unicast transmissions between single-radio nodes. The computer readable medium additionally includes instructions for utilizing the channels of the second set as data channels for unicast and multicast transmissions by multi-radio nodes.

Still other embodiments include a computerized device, configured to process all the method operations disclosed herein as embodiments of the invention. In such embodiments, the computerized device includes a memory system, a processor, communications interface in an interconnection mechanism connecting these components. The memory system is encoded with a process that provides adjacent channel interference avoidance as explained herein that when performed (e.g. when executing) on the processor, operates as explained herein within the computerized device to perform all of the method embodiments and operations explained herein as embodiments of the invention. Thus any computerized device that performs or is programmed to perform up processing explained herein is an embodiment of the invention.

Other arrangements of embodiments of the invention that are disclosed herein include software programs to perform the method embodiment steps and operations summarized above and disclosed in detail below. More particularly, a computer program product is one embodiment that has a computer-readable medium including computer program logic encoded thereon that when performed in a computerized device provides associated operations providing adjacent channel interference avoidance as explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of data communications devices or other entities can also provide the system of the invention. The system of the invention can be distributed between many software processes on several data communications devices, or all processes could run on a small set of dedicated computers, or on one computer alone.

It is to be understood that the embodiments of the invention can be embodied strictly as a software program, as software and hardware, or as hardware and/or circuitry alone, such as within a data communications device. The features of the invention, as explained herein, may be employed in data communications devices and/or software systems for such devices such as those manufactured by Avaya Inc. of Lincroft N.J.

BRIEF DESCRIPTION OF THE DRAWINGS

The foregoing will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Adjacent channel interference (ACI) is caused by energy on channels that are adjacent in the RF spectrum. ACI is a serious problem when the receiver is close to a transmitter on an adjacent channel. A node cannot transmit and receive at once on adjacent channels.

IEEE 802.11 has been allocated multiple non-overlapping channels. (i.e., 3 channels are available in the 2.4 GHz ISM RF band for 802.11b/g and 12 channels are available in the 5 GHz U-NII RF band for 802.11a). These channels can be used simultaneously, if the transmitter of one channel and receiver of the other have sufficient separation between them to render negligible any interference that would result from energy from the transmitter side lobes spreading out across the spectrum onto the other channel. When co-locating multiple radios in the same station, the interference arising when a station receives and transmits simultaneously on adjacent (in the RF spectrum) channels is so high that it blocks reception.

Avoiding use of channels with inadequate RF separation by different radios in the same station is one way to avert adjacent channel interference. Another way is to permit use of adjacent channels by co-located radios, but coordinate transmission times in order to avoid receiving and transmitting simultaneously on adjacent channels, subject of course to timing constraints imposed by the MAC protocol. The first approach reduces the number of channels that are available in a given BSS or mesh network. The second approach leads to shorter delays and greater throughput. The CCC MAC protocol relies on a combination of the above two approaches in order to avoid adjacent channel interference in multiple-radio stations. The determination regarding which approach is used depends on the type of radio(s) and the application.

The CCC protocol is a MAC protocol that provides multi-channel access by both single-radio and multiple-radio stations. It enables stations in a BSS or wireless mesh to access a pool of wireless channels available for their use. The CC-RTS/CC-CTS handshake procedure facilitates dynamic assignment of channels to the data radios without entailing any additional signaling overhead. Stations may be equipped with multiple radios to communicate with one or several other stations simultaneously without experiencing adjacent channel interference. In addition to the basic access coordination mechanism it provides, the CCC protocol also defines a rich set of new features that enables it to address special problems, such as multi-radio nodes and the associated adjacent channel interference, the hidden terminal problem, and the exposed node problem.

The multiple-channel access capability of CCC increases the aggregate throughput of a BSS or mesh network. The ability of a station to operate multiple radios simultaneously increases link and/or node throughput, which alleviates the bottleneck at points of traffic concentration—such as the AP of a BSS or the portal, or nodes near the portal, of an infrastructure mesh. A link with multiple-radio stations as endpoints can also furnish the higher data rates required by certain applications, such as HDTV signals.

To avoid adjacent channel interference, the control channel cannot be adjacent to the data channels. The 5 GHz band has sufficient channels from which to separate one channel that is not adjacent to several other channels, which can serve as data channels. The 2.4 GHz band has only two non-adjacent channels. Use of these two non-adjacent channels by CCC stations operating in that band implies that there can only be one data channel. The throughput on the two channels—control and data—is greater than using a single channel.

CCC is backward compatible with existing 802.11 technologies. All stations, that is, both stations using existing 802.11 technology and CCC compliant stations/APs, can communicate on the control channel through the existing 802.11 MAC protocol.

Alternatively, communication with/among stations not compliant with the CCC MAC could use a "secondary" control channel. This channel is identical to the channel serving an 802.11 BSS. The existing 802.11 MAC would be used to access the secondary control channel. A secondary control channel would be attractive in an infrastructure BSS, where all stations communicate only with the AP. A CCC-compliant AP with multiple radios would dedicate one radio to the secondary control channel. Any CCC stations that do not be use this channel, need not monitor it. The secondary control channel cannot be adjacent to any of the data channels or to the control channel.

The control and data channels can have different PHY protocols, and the same control channel can be used for reservation of data channels with diverse PHY protocols (e.g., 11b, 11g, or 11n channels).

Adjacent channel interference can be prevented between co-located radios operating on adjacent channels by coordinating the incoming and outgoing transmissions of a station. The timing requirements of the short bi-directional CC-RTS/CC-CTS exchanges, however, on the control channel, which must occur within specified time spacing of each other, make control traffic difficult to coordinate. Hence, in order to avoid adjacent channel interference with the data radios the channel assigned to the control radio cannot be adjacent to any of the data channels. No restrictions are required on the choice of a data channel by a station with a single data radio, provided that the data channel is not adjacent to the control channel.

Stations with multiple data radios can avoid use of adjacent data channels, thus avoiding the possibility of adjacent channel interference. In that case, acknowledgements may be sent on the same channel as data. This of course comes with a capacity penalty because, if only every third channel is allowed to be used by co-located data radios, the capacity of a wirelessly connected set (BSS or mesh) will be reduced. Such a capacity reduction is especially serious in wireless mesh networks, because connected nodes (e.g. APs) may only use non-adjacent channels. The pool of data channels allowed in the entire mesh, and its capacity, is thus reduced to one third of the maximum capacity. In WLAN systems where communication between BSSs occurs through wired infrastructure APs, different BSSs may use data channels from different non-adjacent channel sets. In fact, the probability of collisions between contiguous or partially overlapping BSSs is lower if they use different channels. The loss of capacity in that case would be due to insufficient channels becoming available to some of the BSSs when partitioning the channel pool into disjoint sets of non-adjacent channels.

Alternatively, stations with multiple data radios may use as data channels any of the available channels, as long as they are not adjacent to the control channel, with the following precautions:

A station with a free data radio may not transmit on a data channel adjacent to the one it is receiving a transmission. If a non-adjacent data channel is not available, the frames pending transmission will be queued until the received transmission is complete or will be transmitted on the control channel. A station with a free data radio may not accept a reservation to receive a transmission on a channel adjacent to the one on which it is transmitting. Acknowledgement of a successful transmission by a station receiving a transmission from a station on an adjacent channel must be sent on the control channel. Unless there are provisions for the acknowledging station to know the status of other data radios (if any) on the source of the transmission—as for instance through signaling—the acknowledgement should always be sent on the control channel.

Allowing multi-radio stations to use adjacent data channels decreases delay and increases throughput. Frames need not always wait for a non-adjacent data channel to become available before they can be transmitted by an available data radio. Under certain conditions (as described above), a frame can be transmitted immediately.

In order to enable the use of adjacent channels by multiple-radio stations, these stations and the stations communicating with them on data radios must be able to send/receive acknowledgements on the control channel. All other stations, including stations with a single radio, can send all acknowledgements on the channel used for the data traffic.

Figure 1:
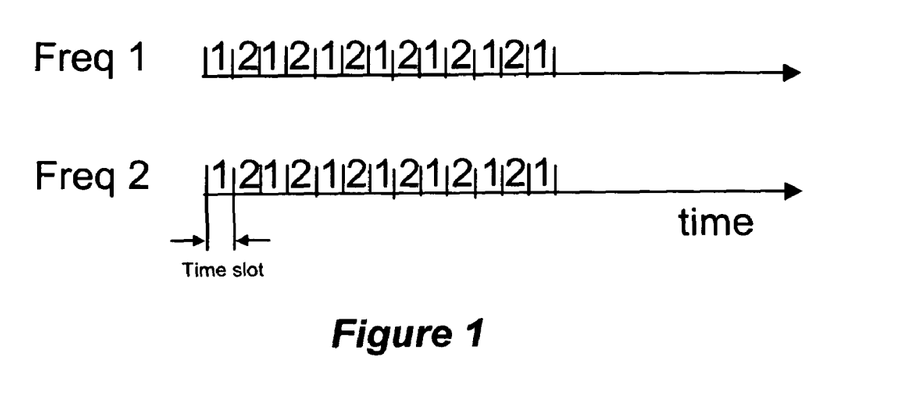
FIG. 1 depicts a timing diagram showing two frequencies, each having been time-slotted to provide time-divided channels.

One way to avoid adjacent-channel interference is to obtain non-adjacent channels in a given band of adjacent channels. An example is shown in FIG. 1. As shown in FIG. 1, each channel (frequency) is time slotted to yield 2 or more time-divided channels; e.g. channel 1 occurs at every other time slot. With all stations synchronized, non-adjacent channels can be derived by using non-concurrent time slots. Channel 1 on Frequency 1 is not adjacent to channel 2 on Frequency 2.

A multiple-radio node that uses a separate non-adjacent channel for acknowledgments can use adjacent channels for data traffic, provided it does not transmit and receive simultaneously on such data channels. The control channel can be used for acknowledgements. A channel different from the control channel and non-adjacent to the data channels can be used for acknowledgments. If the control channel and the acknowledgments channel are adjacent, care must be taken by a node to avoid transmitting and receiving on the two adjacent channels at once. The control channel cannot be adjacent to a data channel of a multi-radio node.

With a single-radio multi-channel access protocol, however, because the control and data channels are never used simultaneously, the control channel can be adjacent to a data channel. Thus, a natural split of the RF spectrum arises in a mixed network, where single-radio and multi-radio nodes share the same control channel. The single-radio nodes can use for data traffic the channels adjacent to the control channel, while the multi-radio nodes may use only channels non-adjacent to the control channel.

A multi-radio node can use adjacent data channels concurrently if traffic flows are in one direction only. The CC-ACK (group acknowledgement on the control channel) makes this possible. The following precautions are taken in reserving data channels:

A n-radio (n>2) node does not reserve a data channel if the node is transmitting on its adjacent channel on another radio; and A n-radio (n>2) node does not accept a request for a data channel if the node is receiving on its adjacent channel on another radio.

Successful receipt of a TXOP on a data channel is acknowledged by sending a group acknowledgment on the control channel by contention. The acknowledgement indicates which of a specified number of frames were transmitted successfully. It is sent on the control channel either when all frames expected in a TXOP are received, regardless of errors, or after a time interval equal to reserved time, if no frames are received by that time.

Figure 2:
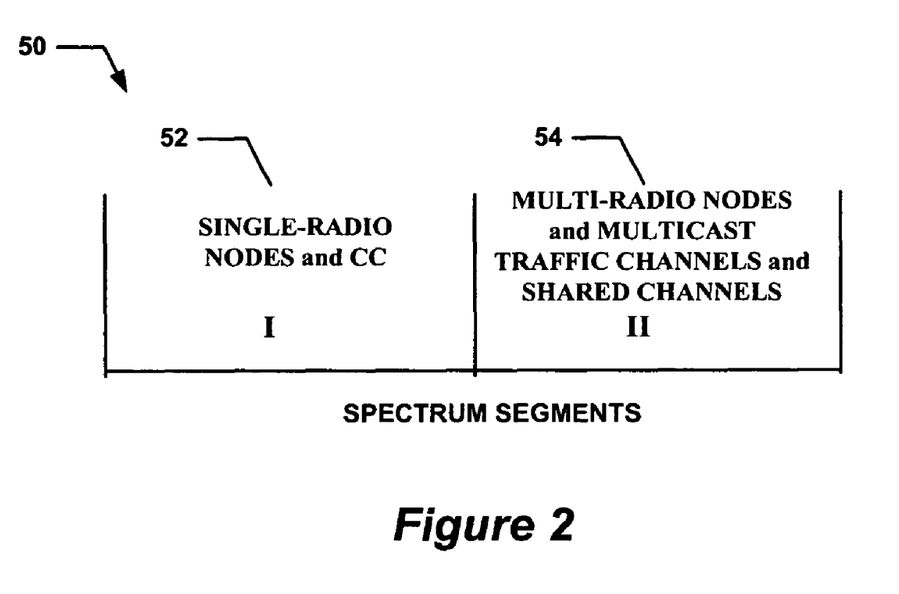
FIG. 2 shows a diagram of a spectrum split into two sets.

Referring now to FIG. 2, the available unlicensed RF spectrum 50 is partitioned into two sets 52 and 54 of mutually non-adjacent channels. In one embodiment, spectrum 52 is used for the control channel and data channels for unicasts between single-radio nodes. Channels in this set 52 may be adjacent to one another (e.g. all channels in 2.4 GHtz band).

The second spectrum 54 contains data channels for unicasts by multi-radio nodes (with other multi- or single-radio nodes) and multicasts. Channels in this set 54 are not adjacent to the channels in set 52 but may be adjacent to one another (e.g. all channels in 5 GHtz band). Multicasting on a data channel will occur on a channel in this set 54. When a wireless network contains both single radio and multi-radio nodes, data transmission between the two types of nodes will occur on a data channel in this set 54. Multi-radio nodes cannot use data channels that are adjacent to the control channel. The control channel can carry multicast traffic.

For unicasts by single-radio nodes, since single-radio nodes do not transmit on both the control and data channel at once, data channels in set 52 must be used. For unicasts by multi-radio nodes, since multi-radio nodes cannot use data channels that are adjacent to the control channel, data channels in set 54 must be used. In a network having both single-radio nodes and multi-radio nodes, data transmission between a single-radio node and a multi-radio node must occur on a channel in set 54. For multicasts on a data channel, both single-radio and multi-radio nodes use the same data channel. Because multi-radio nodes cannot use data channels that are adjacent to the control channel, in a mixed mesh, multicasts on a data channel must occur on a channel in set 54.

Figure 3:
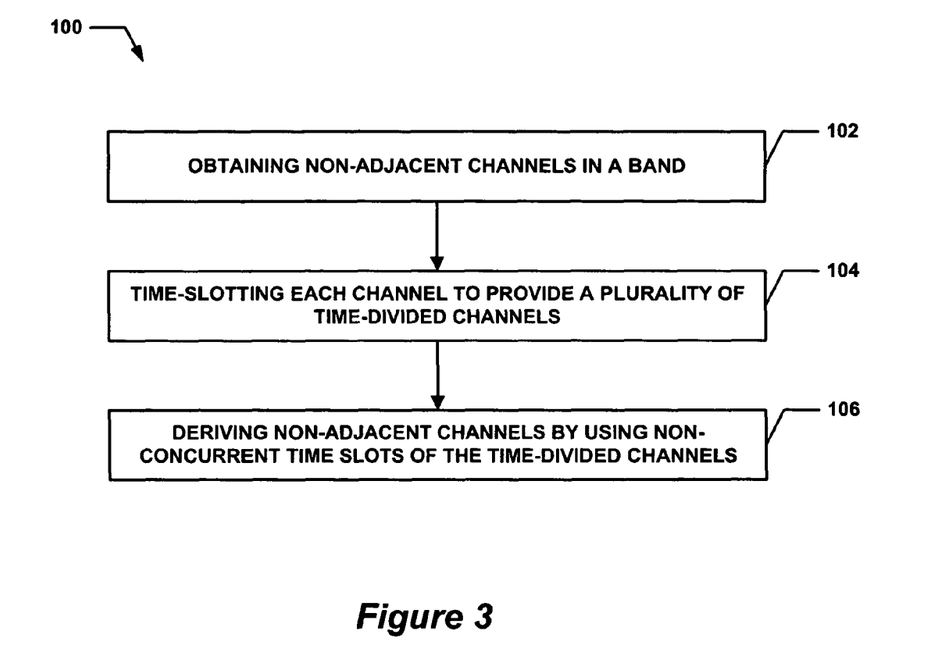
FIG. 3 depicts a flow diagram of a particular embodiment of a first method of providing adjacent channel interference avoidance.
Figure 4A:
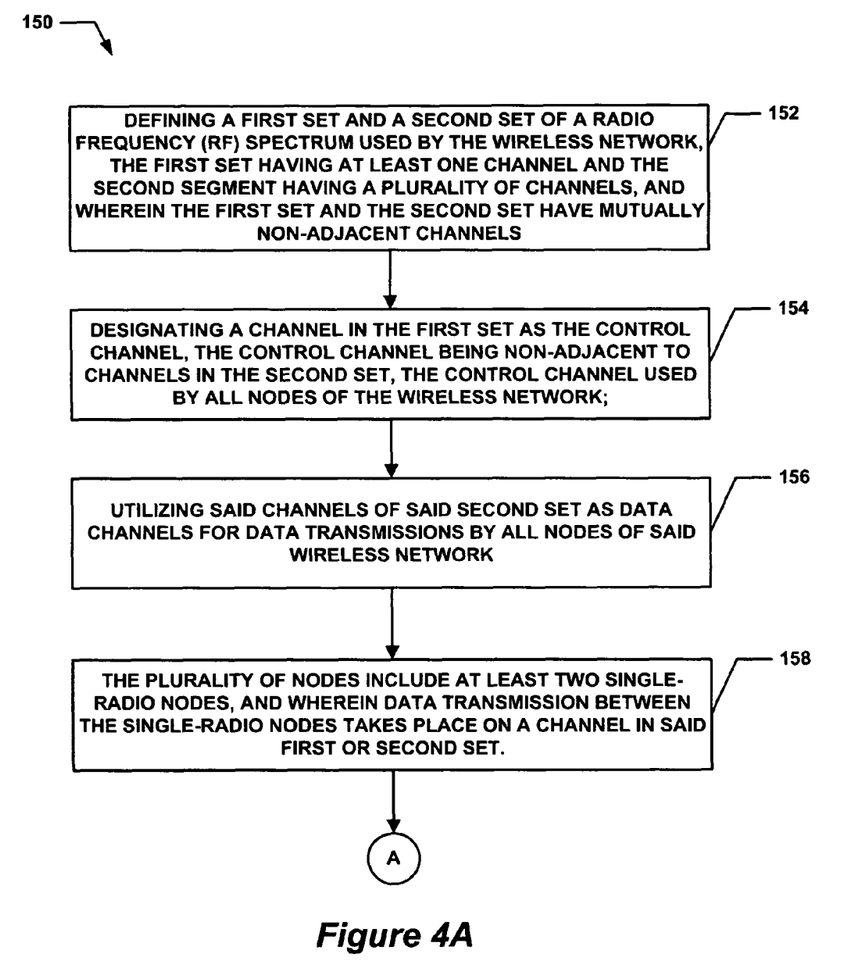
FIGS. 4A and 4B depict a flow diagram of a particular embodiment of a second method of providing adjacent channel interference avoidance.
Figure 4B:
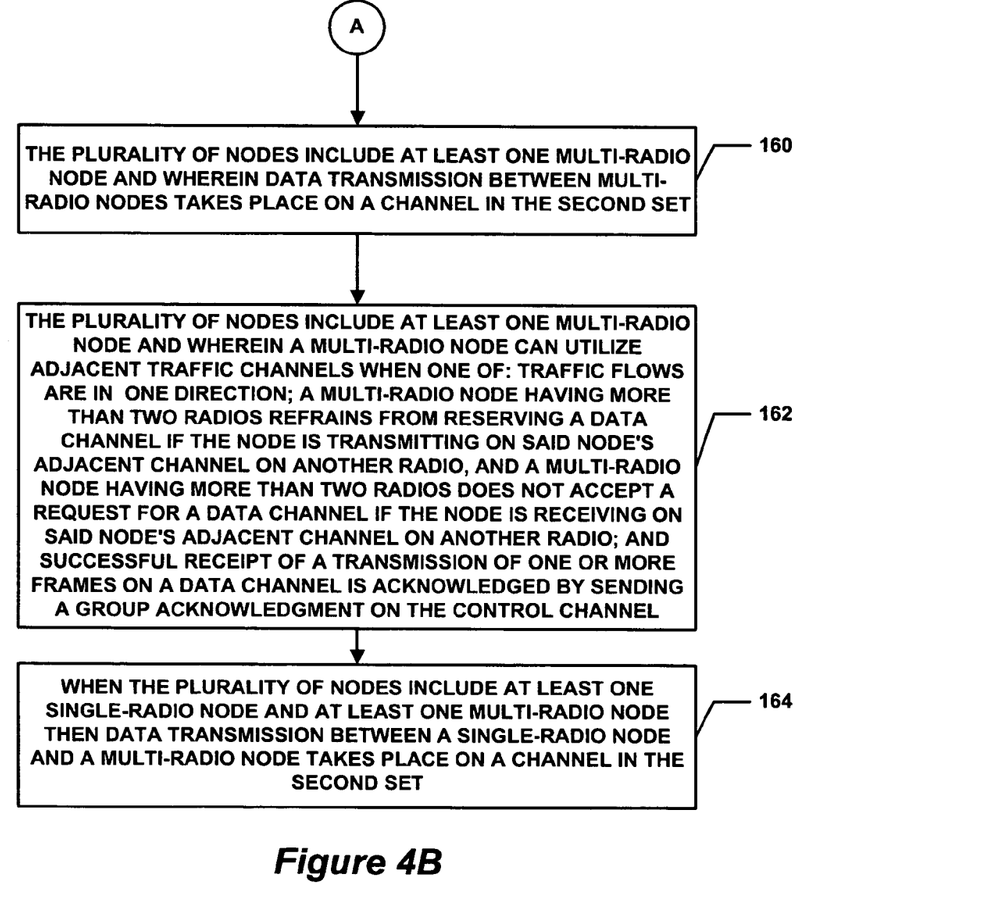

Flow charts of particular embodiments of the presently disclosed methods are depicted in FIG. 3 and FIGS. 4A-4B. The rectangular elements are herein denoted "processing blocks" and represent computer software instructions or groups of instructions. Alternatively, the processing and decision blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Referring now to FIG. 3, a method 100 of providing adjacent channel interference avoidance in a wireless network including a plurality of nodes, the wireless network having a control channel and at least one data channel is shown. The method begins with processing block 102 which recites obtaining non-adjacent channels in a band. Processing block 104 discloses time-slotting each channel to provide a plurality of time-divided channels. Processing block 106 states deriving non-adjacent channels by using non-concurrent time slots of the time-divided channels. As discussed above, each channel (frequency) is time slotted to yield 2 or more time-divided channels. With all stations synchronized, non-adjacent channels can be derived by using non-concurrent time slots.

Referring now to FIGS. 4A and 4B, a particular embodiment of another method 150 for providing adjacent channel interference avoidance in a wireless network including a plurality of nodes, the wireless network having a control channel and at least one data channel is shown. Method 150 begins with processing block 152 which discloses defining a first set and a second set of a Radio Frequency (RF) spectrum used by the wireless network, the first set having a plurality of channels and the second set having a plurality of channels, and wherein the first set and the second set have mutually non-adjacent channels.

Processing continues with processing block 154 which discloses designating a channel in the first set as the control channel, the control channel being non-adjacent to channels in the second set, the control channel used by all nodes of the wireless network.

Processing block 156 states utilizing the channels of the second set as data channels for data transmissions by all nodes of the wireless network. Processing block 158 discloses the plurality of nodes includes at least two single-radio nodes, and wherein to data transmission between the single-radio nodes takes place on a channel in said first or second set.

Processing block 160 discloses the plurality of nodes includes at least one multi-radio node and wherein data transmission between multi-radio nodes takes place on a channel in the second set. Processing block 162 states wherein the plurality of nodes include at least one multi-radio node and wherein a multi-radio node can utilize adjacent data channels when one of:

i) traffic flows are in one direction;
ii) a multi-radio node having more than two radios refrains from reserving a data channel if the node is transmitting on said node's adjacent channel on another radio, and a multi-radio node having more than two radios does not accept a request for a data channel if the node is receiving on said node's adjacent channel on another radio; and iii) successful receipt of a transmission of one or more frames on a data channel is acknowledged by sending a group acknowledgment on the control channel.

Processing block 164 states when the plurality of nodes include at least one single-radio node and at least one multi-radio node then data transmission between a single-radio node and a multi-radio node takes place on a channel in the second set.

Figure 5:
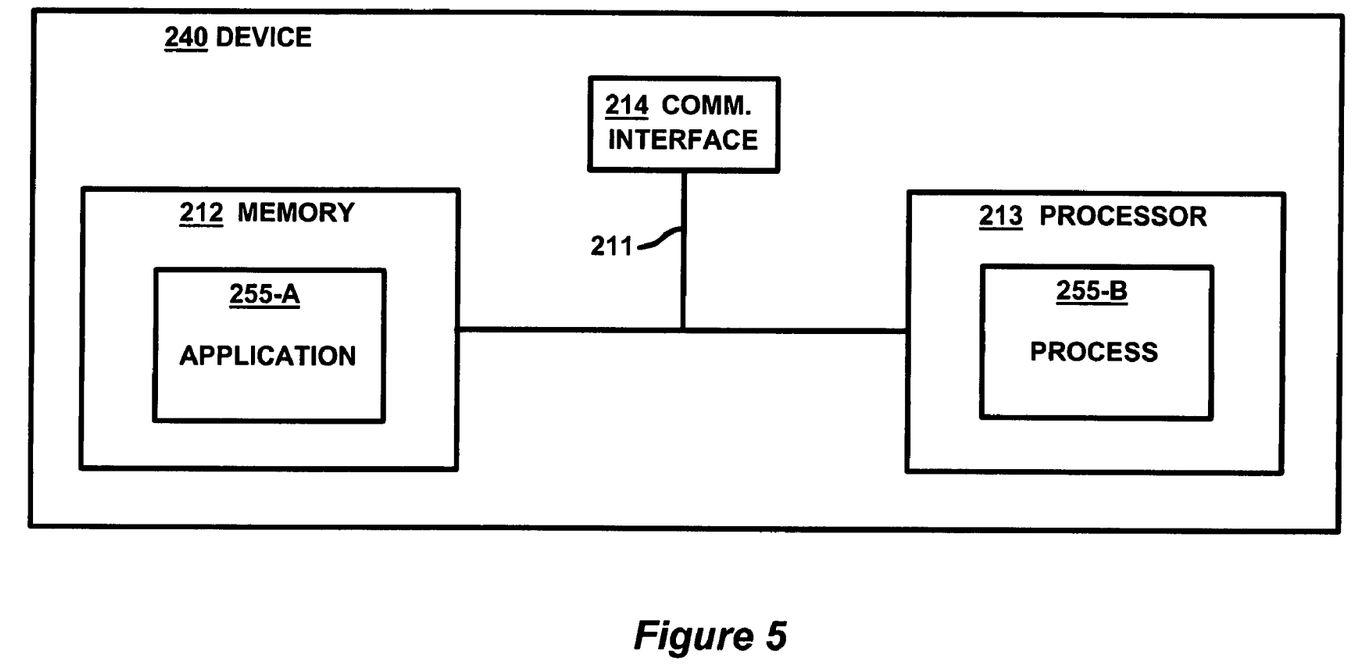
FIG. 5 illustrates an example computer system architecture for a computer system that provides adjacent channel interference avoidance in accordance with embodiments of the invention.

FIG. 5 illustrates example architectures of a computer system that is configured as a node 240. The computer system 240 may be any type of computerized system such as a personal computer, workstation, portable computing device, mainframe, server or the like. In this example, the system includes an interconnection mechanism 211 that couples a memory system 212, a processor 213, and a communications interface 214. The communications interface 214 allows the computer system 240 to communicate with external devices or systems.

The memory system 212 may be any type of computer readable medium that is encoded with an application 255-A that represents software code such as data and/or logic instructions (e.g., stored in the memory or on another computer readable medium such as a disk) that embody the processing functionality of embodiments of the invention for the agent 255 as explained above. The processor 213 can access the memory system 212 via the interconnection mechanism 211 in order to launch, run, execute, interpret or otherwise perform the logic instructions of the applications 255-A for the host in order to produce a corresponding process 255-B. In other words, the process 255-B represents one or more portions of the application 255-A performing within or upon the processor 213 in the computer system.

It is to be understood that embodiments of the invention include the applications (i.e., the un-executed or non-performing logic instructions and/or data) encoded within a computer readable medium such as a floppy disk, hard disk or in an optical medium, or in a memory type system such as in firmware, read only memory (ROM), or, as in this example, as executable code within the memory system 212 (e.g., within random access memory or RAM). It is also to be understood that other embodiments of the invention can provide the applications operating within the processor 213 as the processes. While not shown in this example, those skilled in the art will understand that the computer system may include other processes and/or software and hardware components, such as an operating system, which have been left out of this illustration for ease of description of the invention.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code sets stored thereon. The computer readable medium can also include a communications link, either optical, wired, or wireless, having program code sets carried thereon as digital or analog signals. Accordingly, it is submitted that that the invention should not be limited to the described embodiments but rather should be limited only by the spirit and scope of the appended claims.

What is claimed is:
1. A method of providing adjacent channel interference avoidance in a wireless network including a plurality of nodes, the wireless network having a control channel and at least one data channel, the method comprising:

defining two sets of Radio Frequency (RF) channels used by the wireless network, the first set having at least one channel and the second set having a plurality of channels, and wherein said first set and said second set have mutually non-adjacent channels;

designating a channel in said first set as the control channel, said control channel being non-adjacent to channels in said second set, said control channel used by all nodes of said wireless network; and utilizing said channels of said second set as data channels for data transmissions by all nodes of said wireless network, and wherein a multi-radio node having more than two radios refrains from reserving a data channel if the node is transmitting on said node's adjacent channel on another collocated radio, and a multi-radio node having more than two radios does not accept a request for a data channel if the node is receiving on said node's adjacent channel on another collocated radio.

2. The method of claim 1 wherein when said plurality of nodes include at least two single-radio nodes, and wherein data transmission between the single-radio nodes takes place on a channel in said first or second set.

3. The method of claim 1 wherein when said plurality of nodes include at least one multi-radio node and wherein data transmission between multi-radio nodes takes place on a channel in said second set.

4. The method of claim 1 wherein said plurality of nodes include at least one multi-radio node and wherein a multi-radio node can utilize adjacent data channels when one of:
i) traffic flows are in one direction;
ii) successful receipt of a transmission of one or more frames on a data channel is acknowledged by sending a group acknowledgment on the control channel.

5. The method of claim 1 wherein when said plurality of nodes include at least one single-radio node and at least one multi-radio node and wherein data transmission between a single-radio node and a multi-radio node takes place on a channel in said second set.

6. The method of claim 1 wherein said first set of RF channels are used for a control channel and a data channel for unicast messages between single radio nodes and wherein said second set of RF channels are used for data channels by multiradio nodes and for multicast messages.

7. A non-transitory computer readable medium having computer readable code thereon for providing adjacent channel interference avoidance in a wireless network having a plurality of nodes, a control channel and at least one data channel, the medium comprising:

instructions for defining two sets of Radio Frequency (RF) channels used by the wireless network, the first set having at least one channel and the second set having a plurality of channels, and wherein said first set and said second set have mutually non-adjacent channels;

instructions for designating a channel in said first set as the control channel, said control channel being non-adjacent to channels in said second set, said control channel used by all nodes of said wireless network; and instructions for utilizing said channels of said second set as data channels for data transmissions by all nodes of said wireless network, and wherein a multi-radio node having more than two radios refrains from reserving a data channel if the node is transmitting on said node's adjacent channel on another collocated radio, and a multi-radio node having more than two radios does not accept a request for a data channel if the node is receiving on said node's adjacent channel on another collocated radio.

8. The computer readable medium of claim 7 wherein when said plurality of nodes include at least two single-radio nodes, and further comprising instructions wherein data transmission between the single-radio nodes takes place on a channel in said first or second set.

9. The computer readable medium of claim 7 wherein when said plurality of nodes include at least one multi-radio node and further comprising instructions wherein data transmission between multi-radio nodes takes place on a channel in said second set.

10. The computer readable medium of claim 7 wherein said plurality of nodes include at least one multi-radio node and further comprising instructions wherein a multi-radio node can utilize adjacent data channels when one of:
i) traffic flows are in one direction;
ii) successful receipt of a transmission of one or more frames on a data channel is acknowledged by sending a group acknowledgment on the control channel.

11. The computer readable medium of claim 7 wherein when said plurality of nodes include at least one single-radio node and at least one multi-radio node and further comprising instructions wherein data transmission between a single-radio node and a multi-radio node takes place on a channel in said second set.

12. The computer readable medium of claim 7 wherein said first set of RF channels are used for a control channel and a data channel for unicast messages between single radio nodes and wherein said second set of RF channels are used for data channels by multiradio nodes and for multicast messages.

13. A wireless network system comprising:
a plurality of nodes; and
a Radio Frequency (RF) spectrum used by nodes of the wireless network, the RF spectrum having a first set of channels and a second set of channels, the first set having at least one channel and the second set having a plurality of channels, and wherein said first set and said second set have mutually non-adjacent channels;
wherein when said plurality of nodes include at least two single-radio nodes, and wherein data transmission between the single-radio nodes takes place on a channel in said first or second set; and
wherein when said plurality of nodes include at least one multi-radio node and wherein data transmission between multi-radio nodes takes place on a channel in said second set, and wherein a multi-radio node having more than two radios refrains from reserving a data channel if the node is transmitting on said node's adjacent channel on another collocated radio, and a multi-radio node having more than two radios does not accept a request for a data channel if the node is receiving on said node's adjacent channel on another collocated radio.

14. The wireless network system of claim 13 wherein said plurality of nodes include at least one multi-radio node and wherein a multi-radio node can utilize adjacent data channels when one of:
i) traffic flows are in one direction;
ii) successful receipt of a transmission of one or more frames on a data channel is acknowledged by sending a group acknowledgment on the control channel.

15. The wireless network system of claim 13 wherein when said plurality of nodes include at least one single-radio node and at least one multi-radio node and wherein data transmission between a single-radio node and a multi-radio node takes place on a channel in said second set.

16. The wireless network system of claim 13 wherein said first set of RF channels are used for a control channel and a data channel for unicast messages between single radio nodes and wherein said second set of RF channels are used for data channels by multiradio nodes and for multicast messages.

\* \* \* \* \*